United States Patent
Pilutti et al.

(10) Patent No.: US 8,686,845 B2
(45) Date of Patent: Apr. 1, 2014

(54) AUTOMOTIVE VEHICLE AND METHOD FOR ADVISING A DRIVER THEREIN

(75) Inventors: Thomas Edward Pilutti, Ann Arbor, MI (US); Andrew Waldis, Orion Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 732 days.

(21) Appl. No.: 12/712,446

(22) Filed: Feb. 25, 2010

(65) Prior Publication Data

US 2011/0205045 A1    Aug. 25, 2011

(51) Int. Cl.
*B60C 23/00* (2006.01)
*G08G 1/123* (2006.01)
*G05D 1/02* (2006.01)
*G06F 17/10* (2006.01)

(52) U.S. Cl.
USPC ........... 340/441; 340/439; 340/438; 340/435; 340/988; 701/412; 701/300; 701/301

(58) Field of Classification Search
None
See application file for complete search history.

(56) References Cited

U.S. PATENT DOCUMENTS

| | | | |
|---|---|---|---|
| 5,854,987 A * | 12/1998 | Sekine et al. | 701/41 |
| 5,878,362 A * | 3/1999 | Sekine et al. | 701/41 |
| 5,928,299 A * | 7/1999 | Sekine et al. | 701/41 |
| 5,934,407 A * | 8/1999 | Shimizu et al. | 180/446 |
| 6,141,619 A * | 10/2000 | Sekine | 701/93 |
| 6,151,550 A * | 11/2000 | Nakatani | 701/117 |
| 6,169,495 B1 * | 1/2001 | Koike | 701/302 |
| 6,415,226 B1 * | 7/2002 | Kozak | 701/411 |
| 6,424,904 B1 * | 7/2002 | Takahashi et al. | 701/70 |
| 6,836,719 B2 | 12/2004 | Andersson et al. | |
| 8,204,680 B1 * | 6/2012 | Dorum | 701/411 |
| 2003/0187578 A1 | 10/2003 | Nishira et al. | |
| 2004/0073367 A1 * | 4/2004 | Altan et al. | 701/301 |
| 2005/0234626 A1 * | 10/2005 | Shiiba et al. | 701/70 |
| 2005/0251335 A1 * | 11/2005 | Ibrahim | 701/213 |
| 2008/0015765 A1 * | 1/2008 | Sekine et al. | 701/78 |
| 2008/0269998 A1 | 10/2008 | Shiiba et al. | |
| 2009/0037062 A1 * | 2/2009 | Lee et al. | 701/70 |

(Continued)

FOREIGN PATENT DOCUMENTS

| | | |
|---|---|---|
| JP | 2003063369 A2 | 3/2003 |
| JP | 2003118425 A2 | 4/2003 |
| JP | 2006123588 A2 | 5/2006 |
| JP | 2008013120 A2 | 1/2008 |

OTHER PUBLICATIONS

L. Dorn, Driver Behaviour and Training, Published by Ashgate Publishing, ltd., 2003, ISBN 0754638359, 9780754638353.

*Primary Examiner* — Julie Lieu
(74) *Attorney, Agent, or Firm* — Frank A. MacKenzie; Brooks Kushman P.C.

(57) ABSTRACT

An automotive vehicle may include a navigation system, a speed sensor, an audio, visual or haptic output system, and at least one controller. The controller may be configured to determine if a current speed of the vehicle exceeds a target speed of an upcoming road curvature based on information from the speed sensor and navigation system, to generate a first alert based on a selected driver type via the output system to prompt the driver to disengage the vehicle's accelerator pedal if the current speed of the vehicle exceeds the target speed of the upcoming road curvature, and to generate a second alert after the first alert based on the selected driver type via the output system to prompt the driver to engage the vehicle's brake pedal.

19 Claims, 4 Drawing Sheets

(56) References Cited

U.S. PATENT DOCUMENTS

| | | | |
|---|---|---|---|
| 2010/0207787 A1* | 8/2010 | Catten et al. | 340/905 |
| 2011/0098922 A1* | 4/2011 | Ibrahim | 701/208 |
| 2011/0102166 A1* | 5/2011 | Filev et al. | 340/435 |
| 2011/0205045 A1* | 8/2011 | Pilutti et al. | 340/441 |

* cited by examiner

AUTOMOTIVE VEHICLE AND METHOD FOR ADVISING A DRIVER THEREIN

BACKGROUND

The instances of single vehicle roadway crashes comprise approximately 20 percent of all light vehicle crashes annually in the United States. Within the single vehicle roadway departure crash category, crashes result from four basic categories: lane drifting, control loss, evasive maneuvers, and driver incapacitation. Countermeasures that can attempt to address these crash categories are derived from a variety of sensor systems. Lane drift warning is, in certain circumstances, conventionally addressed by computer vision lane trackers that perform best when the vehicle is slowly drifting toward or across the road edge.

There may be two issues associated with the potential effectiveness of lane tracker based drift warning. The first is due to not always being able to visually track the lane markers. The other is the situation where the vehicle crosses the road edge with high lateral speed such that a warning is of little use to the driver. The high relative lateral speed is usually the result of vehicle control loss or driver evasive maneuvers. Evasive maneuvers, like driver incapacitation, are difficult to address with countermeasures since the driver is occupied or otherwise distracted.

Control loss, on the other hand, may result from excessive speed for the road or road conditions. Control loss in curved road sections may be mitigated by a system that aids the driver in entering a curve at a passable speed. The required forward sight distance, however, may be prohibitive for reliable computer vision based detection of upcoming curves.

SUMMARY

A driver of a vehicle may be advised of an upcoming road curvature. If a current speed of the vehicle exceeds a target speed of the upcoming road curvature, a first alert may be generated to prompt the driver to put the vehicle in a closed throttle deceleration mode. A second alert may be generated after the first alert based on a selected driver type to prompt the driver to put the vehicle in an active brake deceleration mode.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

A reliable source of upcoming road preview information can be gathered from a digital map database that can "look" into the road network ahead of the vehicle to detect upcoming road curvature. Appropriate action to aid the driver in negotiating the curve may then be taken.

A conventional approach is to use map-derived upcoming curvature, calculate the curve speed based on curvature and acceptable curve lateral acceleration, and then determine a warning point before the curve based on a constant deceleration profile.

A first step in this approach may be to determine the upcoming road curvature. Curvature is defined explicitly in the Appendix of this Detailed Description with respect to the direction of the local tangent vector along the path.

Curvature, denoted with the symbol $\kappa$, has units of 1/length with length typically in meters. $\kappa$ is often inverted to form the radius of curvature with units of meters. Radius of curvature, $\rho$, may be thought of as the radius of the curve assuming that the curve radius is reasonably constant. A typical scenario is shown in FIG. 1.

In this scenario, the vehicle is approaching a curve with radius $\rho$. The curvature profile shown in the inset reflects a curve with a transition section where radius of curvature changes from zero to $\rho$. The transition does not always exist in real roads with the radius of curvature change being discontinuous from zero to $\rho$.

Figure 1:
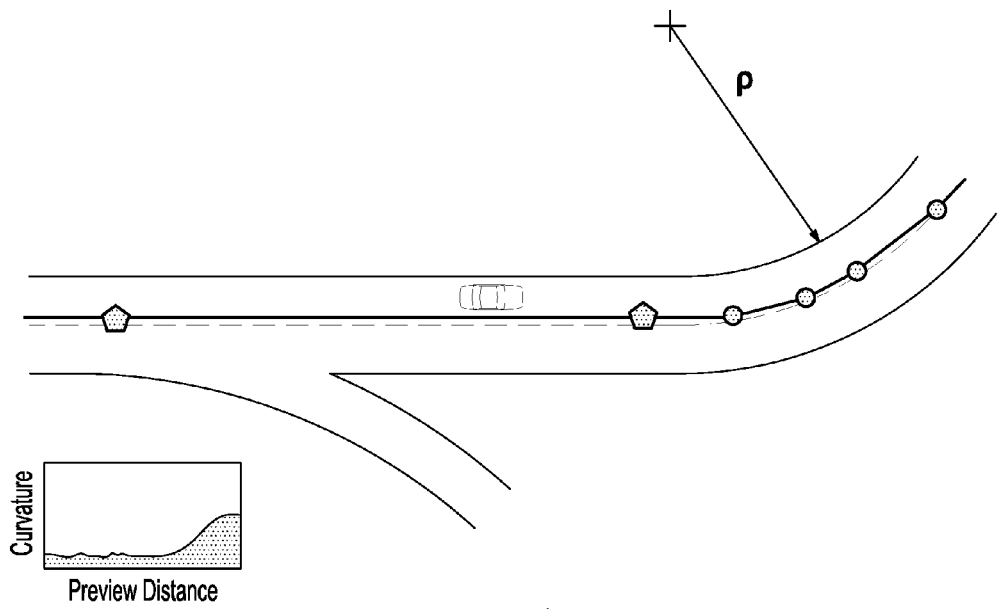
FIG. 1 is a schematic diagram of a vehicle approaching a road curvature.

The pentagonal and circular markers in FIG. 1 represent the map database coordinates that represent the road. Current map databases for production navigation systems may represent the road to approximately ±5 m in an absolute sense. The relative accuracy, however, may be better, and in fact support radius of curvature accuracy within %10 of actual.

The second step may be to determine a target vehicle speed based on the curvature profile determined from the map database. The most basic curve speed determination is done by $$v_\rho = \sqrt{a_{lat}\rho} \qquad (1)$$

where $v_p$ is the speed, and $a_{lat}$ is the target maximum lateral acceleration in the curve. $a_{lat}$ values are typically centered around $2^m/s^2$ (0.2 g).

Another step may be to determine a warning threshold. The threshold is typically a distance determined by a assuming a constant deceleration profile. From basic kinematics, the distance required to change speed from the current vehicle speed to the curve speed under constant deceleration can be determined by $$d_{decel} = \frac{v_\rho^2 - v_{veh}^2}{a_{lon}} \qquad (2)$$

where $d_{decel}$ is the deceleration distance required to slow the vehicle from the current speed $v_{veh}$ to $v_\rho$ over longitudinal acceleration (negative for deceleration) $a_{lon}$. Deceleration is in the range of 1 to $3^m/s^2$. By comparing current vehicle position along the road, as determined by the navigation system, with the $d_{decel}$ distance before the curve, a warning is issued if the vehicle distance to the curve becomes less than $d_{decel}$.

Figure 2:
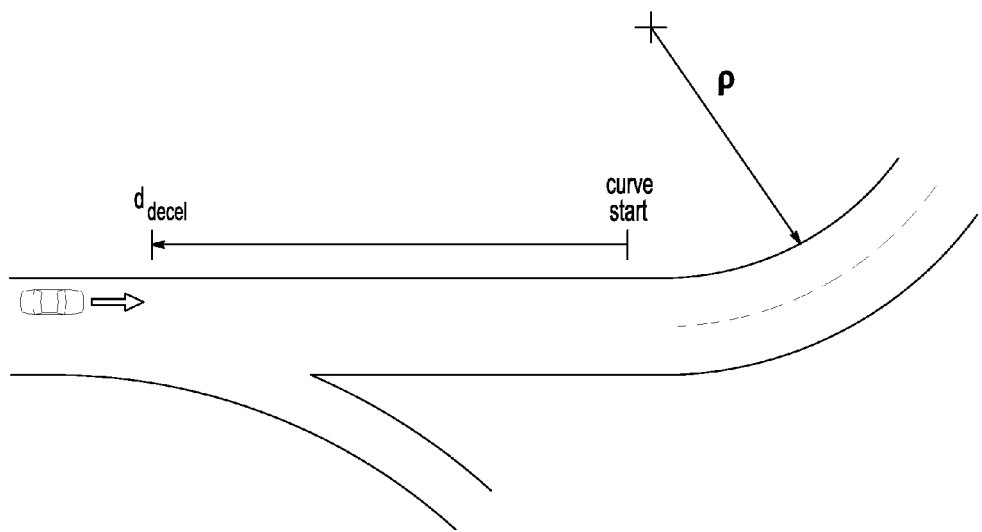
FIG. 2 is another schematic diagram of the vehicle approaching the road curvature.

Using FIG. 1 as an example scenario, FIG. 2 shows the placement of the warning threshold a virtual distance of $d_{decel}$ from the curve start. If the vehicle remains at the speed $v_{veh}$, a warning can be given to the driver when the vehicle gets closer than $d_{decel}$ from the curve start.

The basic approach described above may be improved in several ways. For example, the curve speed determined by (1)

does not take into account the lateral friction and road superelevation. The following formulation, however, does take into account such parameters:

$$v_{max}^2 = \rho_{min} g \left(\frac{e_{max}}{100} + f_{max}\right) \quad (3)$$

where $f_{max}$ is a dimensionless side friction factor, and $e_m$, is the superelevation in percent. Superelevation is also known as road bank, and is defined as the tangent of the bank angle. As can be seen in (3), the $$g\left(\frac{e_{max}}{100} + f_{max}\right) \quad (4)$$

term is an expansion of $a_{lat}$ in (1). So, rather than assuming a generic lateral acceleration, it is possible to incorporate information relating to side friction and superelevation using (3). Certain embodiments described herein may use an estimate of road friction from the vehicle ABS, and may extract superelevation information from a map database.

Different longitudinal deceleration values may be used to compute staged warning thresholds in some embodiments. The acceleration profiles may remain constant over the deceleration distance. By using staged values, however, it is possible to achieve two desirable operational characteristics.

By using a discrete range of deceleration values [−0.1:−0.05:−0.5], it is possible to create a series of thresholds where the warning to the driver becomes more "emphatic" as each successive deceleration distance is crossed by the vehicle as the vehicle approaches the curve without sufficiently reducing speed. The effect is to use a lower, and hopefully less obnoxious, driver warning at the early stage just as a reminder, and if the driver takes action, the warnings go away. Otherwise the warnings get progressively more emphatic.

Driver preferences may influence the warnings. By using the [−0.1:−0.05:−0.5] deceleration values, driver input may affect the early onset threshold. A possible example would be to have an "aggressive," "nominal," and "passive" setting that use progressively lower deceleration values for the first warning onset. Other scenarios are also possible.

The point at which the warning is presented to the driver and/or the speed profile used to decelerate the vehicle may be based upon longitudinal behavior expressed by drivers approaching a curve. Toward that goal of appropriate deceleration behavior, real deceleration profiles were collected and analyzed. This section presents one such example of deceleration behavior collected from a test vehicle as it traveled a connecting ramp between two highways.

The road section is the ramp connecting the eastbound I-94 freeway to the northbound Southfield Freeway (M39) in Michigan. The section is shown in UTM coordinates in FIG. 3. The vehicle traveled from left to right and proceeded north. The sharpest curvature is 0.005 1/m (approximately 200 m radius of curvature).

Data collected from the vehicle for the data run include vehicle speed, brake pedal activation level, accelerator pedal activation level, longitudinal acceleration, and yaw rate. All data were sampled at 20 Hz.

Figure 3:
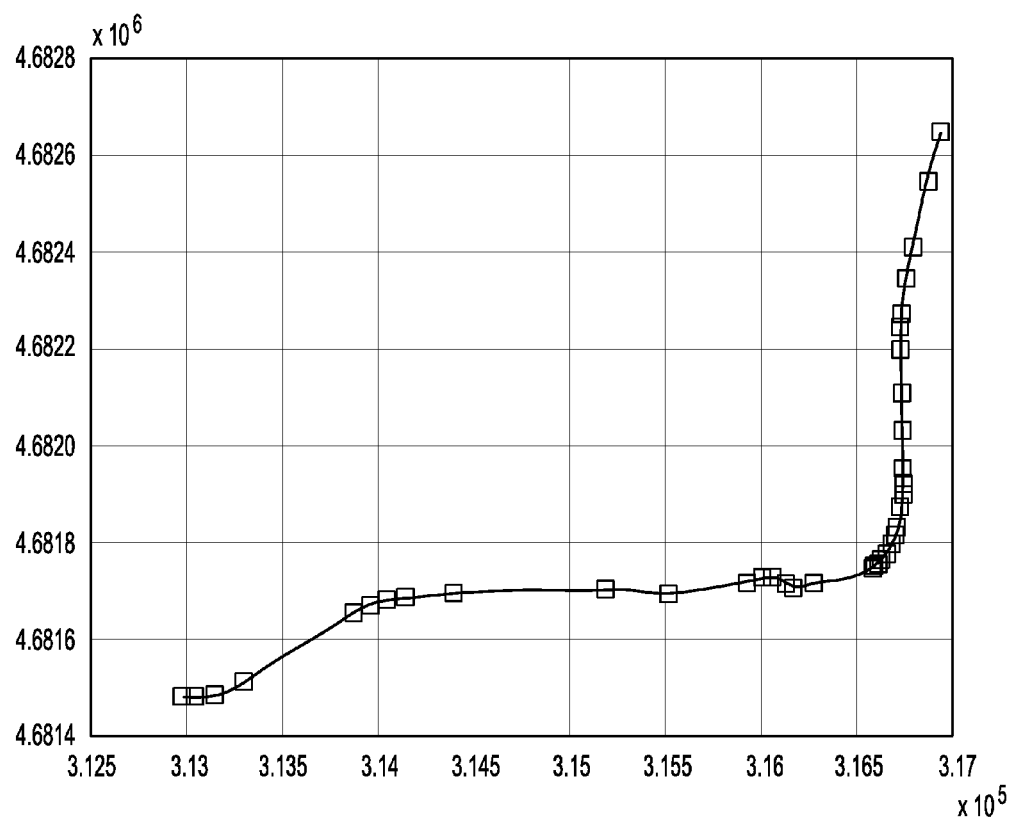
FIG. 3 is a UTM coordinate representation of a road curvature.
Figure 4:
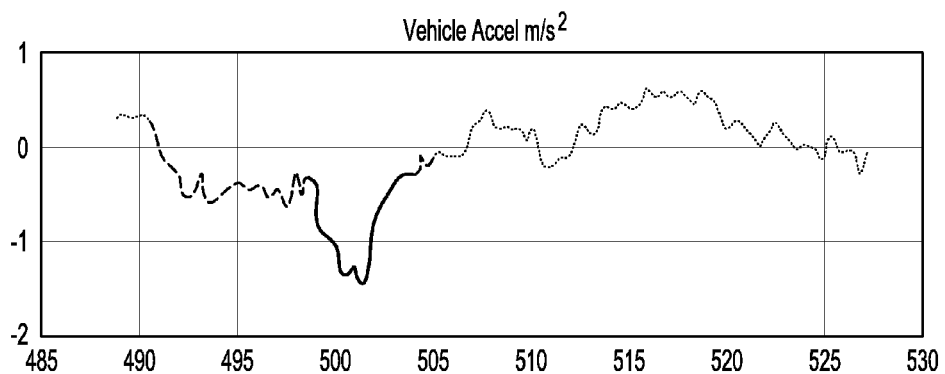
FIG. 4 is a plot of example vehicle acceleration data associated with the road curvature of FIG. 3.
Figure 5:
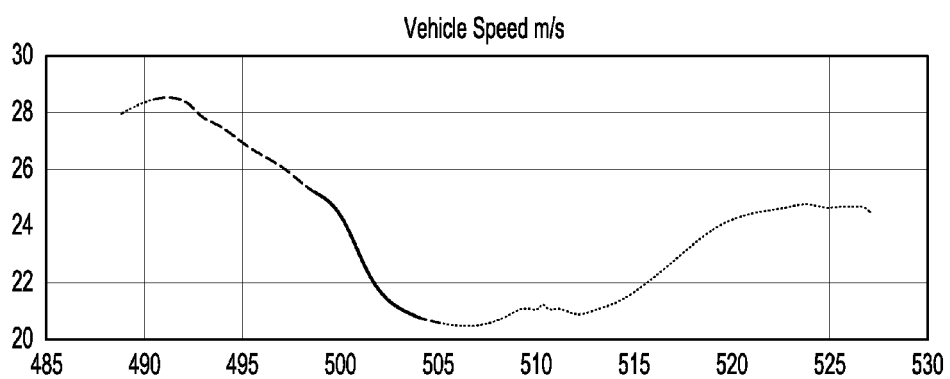
FIG. 5 is a plot of example vehicle velocity data associated with the road curvature of FIG. 3.
Figure 6:
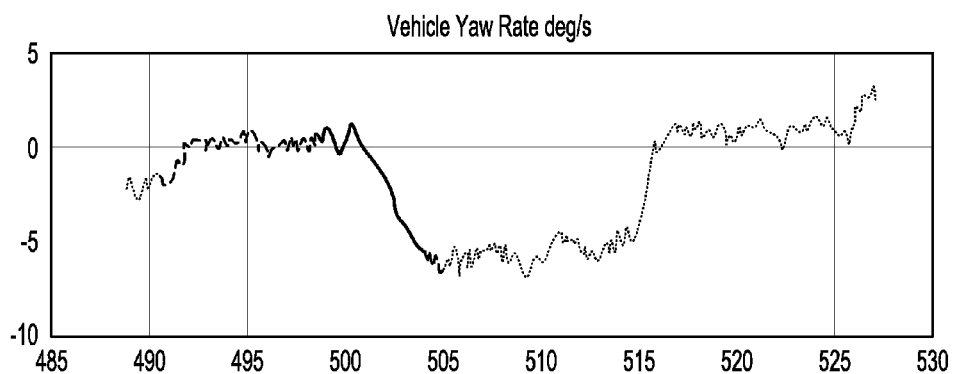
FIG. 6 is a plot of example vehicle yaw rate data associated with the road curvature of FIG. 3.

Three plots are shown in FIGS. 4, 5 and 6 for acceleration, vehicle speed and yaw rate for the drive along the connector ramp from FIG. 3. There are several observations that can be drawn from the plots in FIGS. 4, 5 and 6, but first, some explanation of the significance of the different line types is in order.

In FIG. 4, the deceleration profile is shown with different line types. The dotted line identifies the period of time when the accelerator pedal was being pressed. The dashed line identifies the period of time when the accelerator pedal was in its neutral position, i.e., the driver's foot was off the throttle (no cruise control operating). The heavy solid line identifies the period of time when the brake pedal was being pressed. This is a binary switch. Brake pedal pressure was recorded, but is not shown. The dotted, dashed and heavy solid lines also appear in the vehicle speed plot of FIG. 5 and the yaw rate plot of FIG. 6. The yaw rate plot provides an indication of where along the curve actions take place.

At time=491 seconds, the vehicle begins to decelerate due to engine braking when the throttle pedal goes neutral. The engine braking deceleration rate is approximately −0.5 2 m/s². As the vehicle slows and reaches time=499 seconds, the brake pedal is pressed and the vehicle slows further. The deceleration rate is not constant, and reaches approximately −1.4 m/s² at maximum. From the yaw rate plot of FIG. 6, it can be seen that braking continues into the curve, and ceases when the vehicle is approximately at the point of full curve engagement. As a point of comparison, for steady state conditions, $$\rho = \frac{v}{r} \quad (5)$$

where r is yaw rate in rad/sec, and v is speed in m/sec, the calculated radius of curvature is 200 meters, which is extremely close to the radius of curvature taken from the map database in FIG. 3.

While this set of data represent only one run, there are certain observations that can be made. The first is that the deceleration profile is not constant as is assumed in the typical deceleration distance calculation (2). At first approximation, the deceleration profile comprises two deceleration rates; one for engine only braking, and one for brake system deceleration. The brake system phase is not really constant, but could be approximated as constant with some form of transition between the phases.

The deceleration profile points to the need to be able to accomplish the main tasks in forming either a warning threshold or a velocity profile. The task is to develop an approach that can form a deceleration profile from the current conditions and driver preference. The idea here is to use curve velocity information, present vehicle speed and distance to curve to determine an appropriate deceleration profile. It may include some user setting (e.g., two or more preferences for curve handling-reserved, nominal, performance, etc.) It is expected that settings such as these could compose the two deceleration rates and duration. Other approaches are also possible. With such approaches, either a velocity profile can be input to a control system or a threshold based on distance from curve or velocity error can be presented to warn the driver.

By examining representative data of vehicles being driven on highway curves by various drivers, several observations can be made:

(1) Drivers usually drive at a constant speed (Target Speed) on the curve. This constant speed is usually achieved by light throttling. Cruise control can perform a similar operation with the driver managing the steering task.

(2) Drivers slow down (decelerate) to the Target Speed as they approach the curve and this deceleration continues partly into the curve.

(3) Vehicle deceleration profiles show two distinct phases: Closed Throttle Deceleration and Active Brake Deceleration. In Closed Throttle Deceleration, the driver does not step on the brakes or the throttle, and the vehicle is coasting down using engine braking. This deceleration mode is seen mostly in the first phase. In Active Brake Deceleration, as the driver approaches the curve, the brake is actuated to slow down the vehicle significantly, and this brake action continues sometimes into the curve. This deceleration mode is seen mostly in the second phase.

(4) Different drivers spend different amounts of time in the two modes described above. For example, people who prefer a slow transition from the straight stretch to the curved segment seem to spend much more time in Closed Throttle Deceleration as compared to Active Brake Deceleration, while some 'performance' drivers seem to switch to Active Brake Deceleration while spending substantially less time in Closed Throttle Deceleration.

(5) The level of peak deceleration in the Active Brake Deceleration mode differs for different drivers.

Based on the above observations, a vehicle control strategy may have at least two distinct Modes when the vehicle approaches a curve: Closed Throttle Deceleration mode and Active Brake Deceleration mode.

Because different drivers may show different braking preferences, at least two Driver Preference-Based Factors (DPF) may be available to determine the deceleration profile. The first factor is referred to herein as the Deceleration Time Ratio ($R_T$). $R_T$ is the ratio of time spent in the Closed Throttle Deceleration Mode to time spent in the Active Brake Deceleration Mode. The second factor is referred to herein as the Peak Deceleration ($A_P$). $A_P$ is the peak longitudinal deceleration tolerated by the driver during the Active Brake Deceleration Mode.

These two factors, in certain embodiments, may be used to describe different deceleration profiles seen in test data. For example purposes, three different driver profiles have been chosen:

(1) Comfort Profile—this profile is for a driver who likes a smooth slow transition from highway speed to a lower Curvature Limited Speed. This Driver Profile is assigned a value of 1 in the below algorithm. One would expect such a driver to prefer the highest (of the three example profiles) value for $R_T$ and the lowest value for $A_P$. Such a driver may also want the lowest peak lateral acceleration on the curve. This would also translate to a lower Curvature Limited Speed on the curve.

(2) Normal Profile—this would be the profile of an "average" driver who would not want a "slow" or a "fast" transition from the straight stretch to the curved segment of the highway. This Driver Profile is assigned a value of 2 in the algorithm below. One would expect such a driver to prefer values for DPF and peak lateral acceleration on the curve that are somewhere between the values for the extreme profiles.

(3) Performance Profile—this profile would be exhibited by a driver who would want a rapid speed transition from the straight stretch to the curved segment of the highway. This Driver Profile is assigned a value of 3 in the algorithm below. The values for $A_P$ and peak lateral acceleration on the curve are the highest (of the three profiles) for this driver, while that of $R_T$ is the lowest of the three.

Table 1 lists the nominal DPF values used for these three example driver profiles.

TABLE 1

Nominal DPF Values

| Driver Type | $R_T$ | $A_P$ (m/s²) | Peak Lateral Acceleration (m/s²) |
|---|---|---|---|
| Comfort (1) | 4 | −0.8 | 2 |
| Normal (2) | 3 | −1.5 | 2 |
| Performance (3) | 1 | −2.3 | 2 |

This information may be used, as explained below, to issue driver alerts, based on driver preferences, regarding when to disengage the accelerator pedal and when to engage the brake pedal.

Assume, for example, that a vehicle is traveling at a speed $V_1$ on a straight stretch of highway approaching a curve. The driver conducts a maneuver where the vehicle is in Closed Throttle Deceleration Mode for a time interval $T_1$ and is in Active Brake Mode for a time interval $T_2$. Also, assume that at the end of the two time periods, the vehicle speed is $V_2$ (discussed in more detail below). Now, $V_2$ is related to $V_1$ as $$V_2 = V_1 + A_c T_1 + A_b T_2 \quad (6)$$

where $A_c$ is the deceleration of the vehicle in the Closed Throttle Mode and $A_b$ is the deceleration of the vehicle in the Active Brake Mode. Note that $A_c$ is a function of vehicle speed and vehicle characteristics such as frontal area, aero drag, losses in the driveline, etc. The average deceleration value, $A_a$ during this deceleration maneuver satisfies $$V_2 = V_1 + A_a (T_1 + T_2) \quad (7)$$

Also, note that the Deceleration Time Ratio can be expressed as $$R_T = \frac{T_1}{T_2} \quad (8)$$

Combining (6), (7) and (8), one can derive the following expressions $$A_a = \frac{(A_c R_T + A_b)}{(1 + R_T)} \quad (9)$$

$$T_2 = \frac{(V_2 - V_1)}{(A_a(1 + R_T))} \quad (10)$$

$$T_1 = \frac{R_T(V_2 - V_1)}{(A_a(1 + R_T))} \quad (11)$$

The parameters described above may be selected by the driver in certain embodiments, or in other embodiments, the parameters can be determined adaptively based on driver behavior in previous curve negotiation.

For circumstances where no previous curve negotiation information is available (or where previous curve negotiation information is not used), a driver may select one of the driver types discussed above (e.g., comfort, normal, performance, etc.) using any suitable driver interface (e.g., touch screen, button, etc.) In this example, selecting a driver type effectively specifies $R_T$ and $A_a$ (although in other embodiments, other parameters such as $A_c$, $A_b$ etc. may also be effectively specified via the selection of driver type). That is, the various driver types are mapped to specified values for $R_T$ and $A_a$. $V_1$ is the instant speed of the vehicle as it approaches a curve, and $V_2$ (or target curve speed) may be determined as described herein (or in any suitable/known fashion) based on the peak lateral acceleration allowed while negotiating the curve and/or the curvature information (from any suitable navigation system and/or map database) associated with the curve. $T_1$ and $T_2$ may thus be found via (10) and (11).

The distance, D, from the entry point of an approaching curve at which a first alert, such as an audio, visual and/or haptic alert, may be issued (indicating that the driver should remove their foot from the accelerator pedal to enter the Closed Throttle Deceleration Mode) may be found by $$D = T^2 A_a \qquad (12)$$

where $$T = T_1 + T_2 \qquad (13)$$

A second alert (indicating that the driver should apply the brake to enter the Active Brake Mode) may be issued time $T_1$ after the first alert.

In other embodiments where $A_c$ and $A_b$ are specified via selection of a driver type or otherwise known, the distances from the entry point of the curve at which the first and second alerts are to be generated may be found via the equations above (or derivations thereof). For example, $$d = T_2 A_b \qquad (14)$$

or $$d = \frac{V_{T-T_1}^2 - V_2^2}{2 A_b} \qquad (15)$$

where $V_{T-T1}$ is the instant velocity of the vehicle at time $T_1$ after the first alert. Other scenarios are also possible.

As mentioned above, learning algorithms, analysis of past driver behavior, analysis of other driver behavior (in the same or different vehicles), etc. may be used to determine the parameters discussed above. For example, test data from an instrumented vehicle (similar to that discussed above) may be collected while approaching various curves and analyzed using standard techniques to determine $R_T$. Accelerometer data may be examined to determine $A_a, A_c, A_b$, etc. Alerts, as described above, may then be issued as circumstances dictate.

Figure 7:
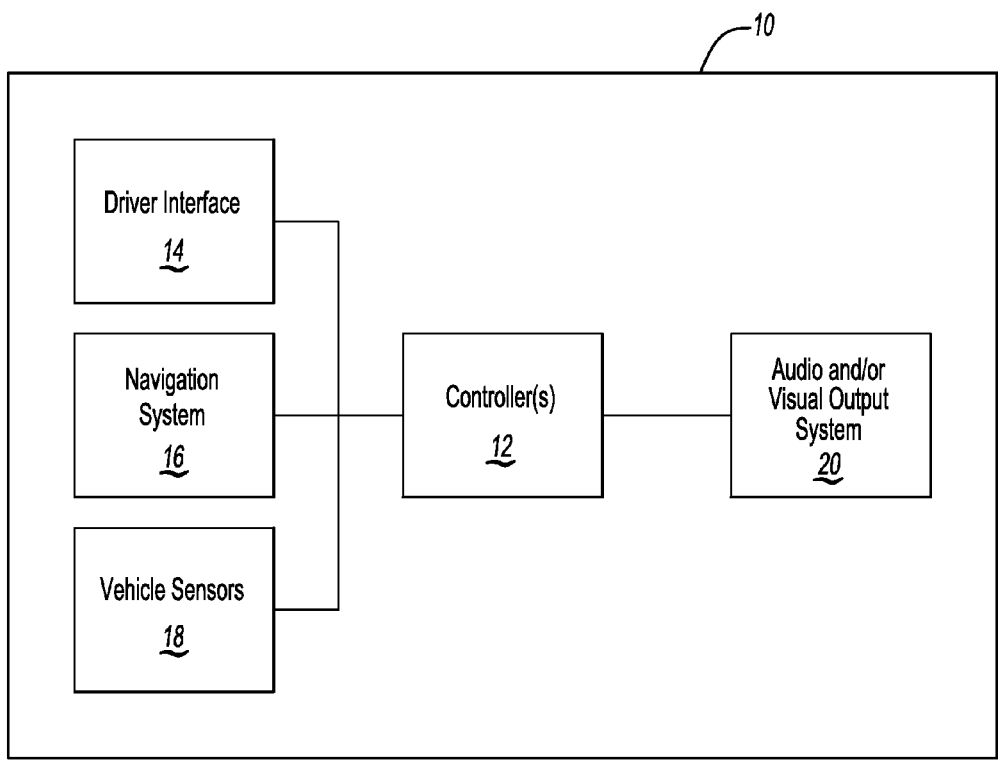
FIG. 7 is a block diagram of a vehicle.

Referring to FIG. 7, a vehicle 10 may include one or more controllers 12, a driver interface 14 (e.g., buttons, touch screen, etc.), navigation system 16, vehicle sensors 18 (e.g., speed sensor(s), acceleration sensor(s), etc.), and an audio, visual and/or haptic output system 20 (e.g., speakers, display screen, haptic pedal, etc.) The driver interface 14, navigation system 16 and vehicle sensors 18 may be in communication with the controllers 12 via any suitable/known communications network such as a car area network, etc. The output system 20 may likewise be under the command of/in communication with the controllers 12 via any suitable/known communications network.

The controllers 12 may perform any (or a portion) of the algorithms disclosed herein. As an example, a driver may select a "comfort" driver type via the interface 14 that effectively specifies certain of the parameters discussed above. Based on this selection as well as curvature information derived from the navigation system 16 and speed information from the vehicle sensors 18 (to determine, for example, whether the current vehicle speed exceeds the target vehicle speed of the road curvature), the controllers 12 may activate the output system 20 as described herein to alert the driver of an approaching curve and/or signal when the driver should disengage the accelerator pedal and subsequently engage the brake pedal. As another example, the controllers 12 may record and analyze data similar to that discussed with references to FIGS. 4, 5 and 6 to identify certain of the parameters (e.g., $R_T$, $A_b$, etc.) discussed herein. Based on these determined parameters as well as curvature information derived from the navigation system 16 and speed information from the vehicle sensors 18, the controllers 12 may activate the output system 20 as described herein.

The algorithms disclosed herein may be deliverable to a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

Appendix

The curvature, κ, associated with a curve may be defined as the instantaneous change of the unit vector tangent T with respect to the path of travel s such that $$\kappa = \frac{dT}{ds} \qquad (16)$$

Thus, for an arc r=f(t)i+g(t)j with unit tangential vector and unit normal vector j, the components of the vector r are defined as parametric functions $$x = f(t), y = g(t) \qquad (17)$$

and the velocity vector is the derivative of the vector r as in v(t)=r'(t). The unit vector tangent to the path of travel can then be computed $$T(t) = \frac{v(t)}{|v(t)|} = \frac{f' i + g' j}{(f'^2 i + g'^2 j)^{1/2}} \qquad (18)$$

where f' is the derivative of f. Using the chain rule on (16) yields $$\frac{dT}{ds} = \frac{dT}{dt} \frac{dt}{ds} \qquad (19)$$

where $$\frac{dt}{ds} = \frac{1}{|v(t)|} \qquad (20)$$

The expression for κ is now $$\kappa(t) = \frac{T'(t)}{|v(t)|} \quad (21)$$

and for the magnitude of curvature $$\kappa(t) = \left|\frac{T'(t)}{|v(t)|}\right| \quad (22)$$

Starting with (18) and letting $A=f'^2+g'^2$ yields $$T = \frac{f'i}{A^{1/2}} + \frac{g'j}{A^{1/2}} \quad (23)$$

Taking T'(t) yields $$T'(t) = \frac{d}{dt}\left[\frac{1}{\sqrt{A}}(f'i+g'j)\right] \quad (24)$$

$$= \frac{1}{\sqrt{A}}(f''i+g''j) - \frac{1}{2A\sqrt{A}}(2f'f''+2g'g'')(f'i+g'j)$$

$$T'(t) = \frac{(g'^2 f'' - g'g''f')i + (f'^2 g'' - f'f''g')j}{A\sqrt{A}}$$

and substituting (24) into (22) along with $|v(t)|=\sqrt{A}$ yields $$\kappa(t) = \left|\frac{T'(t)}{|v(t)|}\right| \quad (25)$$

$$= \left[\frac{(g'^2 f'' - g'g''f')^2 i + (f'^2 g'' - f'f''g')^2 j}{A^4}\right]^{1/2}$$

$$= \frac{1}{A^2}\left[\begin{array}{l}(g'^4 f''^2 - 2g'^2 f''g'g''f' + g'^2 g''^2 f'^2) + \\ (f'^4 g''^2 - 2f'^2 g''f'f''g' + f'^2 f''^2 g'^2)\end{array}\right]^{1/2}$$

$$\kappa(t) = \frac{1}{A^2}\left[\begin{array}{l}g'^2(g'^2 f''^2 - 2f''g'g''f' + g''^2 f'^2) + \\ f'^2(f'^2 g''^2 - 2g''f'f''g' + f''^2 g'^2)\end{array}\right]$$

Note that the t parameter was left out of the right hand side for clutter considerations. Collecting terms, and substituting $A=f'^2+g'^2$ back into (25) yields $$\kappa(t) = \frac{[(f'^2+g'^2)(g'^2 f''^2 - 2f'f''g'g'' + f'^2 g''^2)]^{1/2}}{(f'^2+g'^2)^2} \quad (26)$$

Canceling common terms and noticing that $$g'^2 f''^2 - 2ff''g'g'' + f'^2 g''^2 = (g'f'' - f'g'')^2 \quad (27)$$

we have the desired final form for curvature $$\kappa(t) = \frac{g'(t)f''(t) - f'(t)g''(t)}{(f'^2(t) + g'^2(t))^{3/2}} \quad (28)$$

Thus for twice-differentiable functions f(t) and g(t), it is possible to construct a vector of curvature magnitude values for each t. As such, curvature has units of 1/length length with length typically in meters. κ is often inverted to form the radius of curvature with units of meters. (Radius of curvature is directly found next.)

Figure 8:
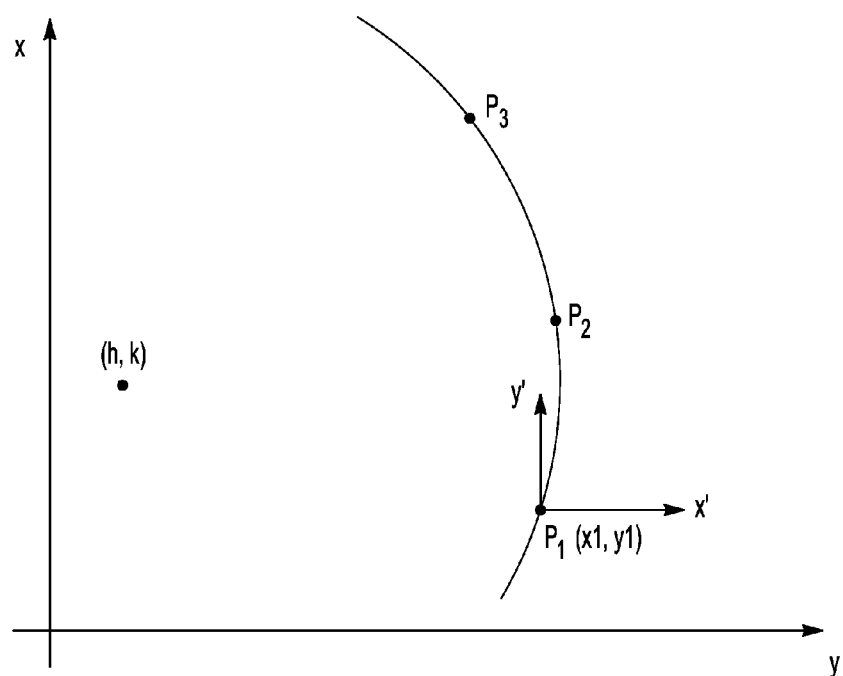
FIG. 8 is a plot of a circle fit to 3 non-collinear points.

A circle can be exactly fit between three non-collinear points $P_1$, $P_2$, and $P_3$ such that $$(x-h)^2+(y-k)^2=r^2 \quad (29)$$

where h and k form the coordinates of the circle center with radius r (radius of curvature 1/κ) as shown in FIG. 8. The geometric approach of (29) allows a curvature calculation for any orientation of the circle in the xy plane.

The solution for the radius involves calculation of the (h,k) pair, and determining the length from (h,k) to one of the points P. Translating the coordinate system from xy to x'y' using $P_1$ as the origin of the x'y' frame such that $x'=x-x_1$ and $y'=y-y_1$ changes (29) to $$(x'-h')^2+(y'-k')^2=r^2 \quad (30)$$

where $h'=h-x_1$ and $k'=k-y_1$. The relocated origin could also have been $P_2$ or $P_3$, but $P_1$ was used in this case as it relates to the vehicle position being the origin of the local vehicle coordinate system.

Substituting $P_1$, $P_2$, and $P_3$ into (30) yields $$h'^2+k'^2-r^2=0$$

$$(x'_2-h')^2+(y'_2-k')^2-r^2=0$$

$$(x'_3-h')^2+(y'_3-k')^2-r^2=0 \quad (31)$$

where $x'_2=x_2-x_1$ and $x'_3=x_3-x_1$. Expanding the last two expressions in (31) yields $$x'^2_2 - 2x'_2 h' + h'^2 + y'^2_2 - 2y'_2 k' + k'^2 - r^2 = 0$$

$$x'^2_3 - 2x'_3 h' + h'^2 + y'^2_3 - 2y'_3 k' + k'^2 - r^2 = 0 \quad (32)$$

and eliminating $h'^2$, $k'^2$ and $r^2$ by subtraction with the first expression in (31) yields $$x'^2_2 - 2x'_2 h' + y'^2_2 - 2y'_2 k' = 0$$

$$x'^2_3 - 2x'_3 h' + y'^2_3 - 2y'_3 k' = 0 \quad (33)$$

which can now be solved for h' and k' such that $$\begin{Bmatrix} h' \\ k' \end{Bmatrix} = \begin{bmatrix} 2x'_2 & 2y'_2 \\ 2x'_3 & 2y'_3 \end{bmatrix}^{-1} \begin{Bmatrix} x'^2_2 + y'^2_2 \\ x'^2_3 + y'^2_3 \end{Bmatrix} \quad (34)$$

Finally, the radius of curvature ρ is calculated from $$\rho = \sqrt{h^2+k^2} \quad (35)$$

with $$h=h'+x_1$$

$$k=k'+y_1 \quad (36)$$

What is claimed:

1. An automotive vehicle including accelerator and brake pedals, the vehicle comprising:
a navigation system;
a speed sensor;
an audio, visual or haptic output system; and
at least one controller configured (i) to determine if a current speed of the vehicle exceeds a target speed of an upcoming road curvature based on information from the speed sensor and navigation system, (ii) to generate a first alert based on a selected driver type for the output system indicating that the accelerator pedal should be disengaged if the current speed of the vehicle exceeds the target speed of the upcoming road curvature, and (iii) to generate a second alert after the first alert based on the selected driver type for the output system indicating that the brake pedal should be engaged.

2. The vehicle of claim 1 wherein the at least one controller is further configured to determine a distance from the upcoming road curvature at which to generate the first alert.

3. The vehicle of claim 1 wherein the at least one controller is further configured to determine a distance from the upcoming road curvature at which to generate the second alert.

4. The vehicle of claim 1 wherein the at least one controller is further configured to select at least one of a deceleration time ratio parameter and an acceleration parameter based on the selected driver type.

5. The vehicle of claim 1 wherein the at least one controller is further configured to determine when to generate the first alert before entering the upcoming road curvature.

6. The vehicle of claim 1 wherein the at least one controller is further configured to determine when to generate the second alert after generating the first alert.

7. A method for advising a driver of a vehicle comprising:
receiving input selecting a driver type;
determining whether a current speed of the vehicle exceeds a target speed of an upcoming road curvature;
generating a first alert based on the selected driver type indicating that the vehicle should be operated in a closed throttle deceleration mode if the current speed of the vehicle exceeds the target speed of the upcoming road curvature; and
generating a second alert after the first alert based on the selected driver type indicating that the vehicle should be operated in an active brake deceleration mode.

8. The method of claim 7 wherein generating a first alert based on the selected driver type includes selecting at least one of a deceleration time ratio parameter and an acceleration parameter.

9. The method of claim 8 wherein generating a first alert based on the selected driver type includes determining when to generate the first alert based on the selected parameter or parameters.

10. The method of claim 8 wherein generating a first alert based on the selected driver type includes determining where to generate the first alert relative to the road curvature based on the selected parameter or parameters.

11. A method for advising a driver of a vehicle comprising:
if a current speed of the vehicle exceeds a target speed of an upcoming road curvature, generating a first alert indicating that the vehicle should be operated in a closed throttle deceleration mode; and
generating a second alert after the first alert based on a selected driver type indicating that the vehicle should be operated in an active brake deceleration mode.

12. The method of claim 11 further comprising, before generating the first alert, determining a duration of time during which the vehicle should be in the closed throttle deceleration mode.

13. The method of claim 11 further comprising, before generating the first alert, determining a distance from the road curvature at which to generate the first alert.

14. The method of claim 11 further comprising, before generating the second alert, determining a duration of time during which the vehicle should be in the active brake deceleration mode.

15. The method of claim 11 further comprising, before generating the second alert, determining a distance from the road curvature at which to generate the second alert.

16. The method of claim 11 wherein the first alert is generated based on the selected driver type.

17. The method of claim 11 wherein generating the second alert based on the selected driver type includes selecting at least one of a deceleration time ratio parameter and an acceleration parameter based on the selected driver type.

18. The method of claim 17 wherein generating the second alert based on the selected driver type includes determining when to generate the second alert based on the selected parameter or parameters.

19. The method of claim 17 wherein generating the second alert based on the selected driver type includes determining where to generate the second alert relative to the road curvature based on the selected parameter or parameters.

* * * * *